United States Patent
Cochran (10) Patent No.: US 6,764,590 B1
(45) Date of Patent: Jul. 20, 2004

(54) AUTOMATED MACHINE CONTROL GAP FOR CONICAL FLUID DYNAMIC BEARING ECM GROOVING

(75) Inventor: Dustin Alan Cochran, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 255 days.

(21) Appl. No.: 10/080,755

(22) Filed: Feb. 22, 2002

Related U.S. Application Data (60) Provisional application No. 60/337,333, filed on Nov. 8, 2001.

(51) Int. Cl.$^7$ ............................ C25F 3/00; C25D 17/00; C25B 11/00
(52) U.S. Cl. .................. 205/654; 205/680; 204/224 M; 204/280
(58) Field of Search ........................... 204/224 M, 280; 205/652, 654, 668, 672

(56) References Cited

U.S. PATENT DOCUMENTS 3,637,481 A    1/1972  Williams .................... 204/224

6,267,869 B1 * 7/2001 MacLeod et al. ........... 205/668

FOREIGN PATENT DOCUMENTS

| EP | 60211118 | 4/1984 |
|---|---|---|
| WO | WO 01/30526 A1 | 5/2001 |
| WO | PCT/US02/35820 | 11/2002 |

* cited by examiner

Primary Examiner—Patrick Ryan
Assistant Examiner—Thomas H. Parsons
(74) Attorney, Agent, or Firm—Moser Patterson & Sheridan LLP (57) ABSTRACT

In one aspect of the invention, an apparatus for ECM grooving of a workpiece is provided. A portion of a conical workpiece is supported on a frame, with the cone opening facing a Z-axis. A slide electrode assembly is provided, including an electrode movable along the Z-axis and having, on a face aligned across a machining gap from the workpiece, a pattern of grooves to be defined on the workpiece; As an electrolyte is pumped into or through the machining gap at a constant static pressure, the electrode reacts to the pressure by moving toward or away from the workpiece to establish a certain gap width to create the necessary groove depth and definition. The force acting on the slide electrode assembly is the primary controlling factor for establishing the machining gap as the electrode and support move in response to the constant static pressure of pumped electrolyte.

20 Claims, 5 Drawing Sheets

AUTOMATED MACHINE CONTROL GAP FOR CONICAL FLUID DYNAMIC BEARING ECM GROOVING

CROSS-REFERENCE TO RELATED APPLICATION

This application is based on U.S. Provisional Patent Application Serial No. 60/337,333 filed on Nov. 8, 2001, entitled AUTOMATED MACHINE CONTROL GAP FOR CONICAL FLUID DYNAMIC BEARING ECM GROOVING, invented by inventor Dustin A. Cochran. The priority of this provisional application is claimed and this provisional application is incorporated herein by reference.

FIELD OF THE INVENTION

This invention pertains generally to the field of fluid dynamic bearings, and more particularly to etching grooves in a conical element of a fluid dynamic bearing.

BACKGROUND OF THE INVENTION

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or runout in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrustplate to support a hub and the disc for rotation.

In a fluid dynamic bearing, a lubricating fluid such as gas or a liquid or air provides a bearing surface between a fixed member and a rotating member of the disc drive. Dynamic pressure-generating grooves formed on a surface of the fixed member or the rotating member generate a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout. However, to be effective, the pressure-generating grooves must be very accurately defined, both as to shape and depth, on a high-speed basis.

One generally known method for producing the dynamic pressure-generating grooves is described in U.S. Pat. No. 5,758,421, to Asada, (ASADA), hereby incorporated by reference. ASADA teaches a method of forming grooves by pressing and rolling a ball over the surface of a workpiece to form a groove therein. The diameter of the ball is typically about 1 mm, and it is made of a material such as carbide which is harder than that of the workpiece. This approach and the resulting fluid dynamic bearing, while a tremendous improvement over spindle motors using a ball bearing, is not completely satisfactory. One problem with the above method is the displacement of material in the workpiece, resulting in ridges or spikes along the edges of the grooves. Removing these ridges, for example by polishing or deburring, is often a time consuming and therefore a costly process. Moreover, to avoid lowering yields, great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past one or more of the shaft, the sleeve or the hub, could be made of a softer material, for example brass or aluminum, now all of these components must frequently be made out of a harder metal such as, for example, steel, stainless steel or an alloy thereof. These metals are as hard or harder than the material of the ball. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

Another method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked prior to patterning or etching. Another problem is that the coating must be removed after etching. This is frequently a difficult task and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photo resists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method allow the grooves to be formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

As the result of the above problems, electrochemical machining of grooves in a fluid dynamic bearing has been developed. A broad description of ECM is as follows. ECM is a process of removing material metal without the use of mechanical or thermal energy. Basically, electrical energy is combined with a chemical to form a reaction of reverse electroplating. To carry out the method, direct current is passed between the work piece which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into solution, with the electrolyte as metal ions and form metallic hydroxides. These metallic hydroxide (MOH) molecules are carried away to be filtered out. However, this process raises the need to accurately and simultaneously pace grooves on a surface across a gap which must be very accurately defined, as the setting of the gap will determine the rate and volume at which the metal ions are carried away. Even in simple structures, this problem can be difficult to solve. When the structure is the interior surface of a conical bearing, the setting of the gap width can be extremely difficult. Manufacturability issues associated with conical parts often make it difficult to control the diameter of the cones. Therefore, it is very difficult to make a tool with fixed electrodes that will guarantee a continued consistent work piece to electrode gap. As noted above, the distance is paramount to the accuracy of grooved depth.

Given the above, it is necessary to create or define a tool used to form the grooves incorporating moving electrodes. Utilizing moving electrodes gives rise to another problem, ie, how to set the gap between the electrode and the working surface on which the grooves are to be defined. The electrode/workpiece gap itself is in many instances the "critical orifice". Critical orifice flow measurement is utilized because the setting of the gap will determine the rate and volume at which the metal ions are carried away, all other parameters being unchanged, and thereby determines the shape and depth of the grooves being formed.

In known designs, the gap is varied to yield a predetermined mass flow, and the position of the electrode relative to the workpiece is adjusted mechanically to establish the gap. This takes up to thirty seconds in time, which translates directly into manufacturing costs. The present invention provides a solution to this and other problems, and offers other advantages over the prior art.

SUMMARY OF THE INVENTION

The present invention relates to method and apparatus for electrochemically etching grooves in a surface of a conical bearing to be used to form a fluid dynamic bearing.

In one aspect of the invention, the gap defined between the electrode and the workpiece is automatically adjusted in response to the pressure of the inflow of the electrolyte.

In another aspect of the invention, apparatus is provided comprising a weighted or biased electrode which is mounted to automatically adjust the gap between the electrode and the workpiece in response to the pressure of the electrolyte inflow, with current flow rate being held constant.

In accordance with one embodiment, the female portion of a dual cone or single cone work piece is supported on a frame or platen, with the cone opening facing an axis which we shall designate the Z-axis. A slide electrode assembly is provided, preferably working along an axis which coincides with the support axis for the conical workpiece. The electrode assembly comprises a static element which supports the dynamic elements of the electrode assembly, and a dynamic element which comprises a electrode weighted or biased by a known mass and movable along the Z-axis. The electrode includes, on a face which will be aligned across a machining gap from the workpiece a pattern of grooves which are to be defined on the workpiece; the pattern comprises conductive elements so that the necessary current flow between the workpiece and the electrode can be established. As the electrolyte is pumped into or through the machining gap between the workpiece and the dynamic electrode at a constant static pressure, the dynamic electrode reacts to the pressure by moving toward or away from the workpiece to establish the a certain gap width to create the necessary groove depth and definition. The force acting on the electrode slide assembly is the controlling factor for establishing the machining gap as the electrode and dynamic support move in response to the constant static pressure of pumped electrolyte.

Since the electrolyte is pumped at a constant pressure, the electrode will reach an equilibrium portion along the Z-axis with the electrode pattern facing the conical surface, thereby controlling the machining gap.

In a preferred form, the electrode slide assembly is intended to be near frictionless in the direction of movements relative to the conical element (the Z-axis). The slide assembly is further designed to have a very high force versus displacement ratio in the x and y (horizontal) axes, so that a very accurate placement of the groove pattern on the conical surface is achieved.

In a preferred form, the slide assembly comprises an aero-static bearing operating at a high pressure with a very small radial clearance (0.002 to 003 mm) between the moving elements. A further benefit of using such an aero-static slide mechanism is that it is self-sealing which will keep the ECM electrolyte (typically, salt water or the like) out of critical areas apart from the gap between the electrolyte and the workpiece.

Other features and advantages of the invention will be apparent to a person of skill in the art who studies a followed detailed description of an embodiment of the invention given in conjunction with the associated drawings.

DETAILED DESCRIPTION OF THE INVENTION

Figure 1:
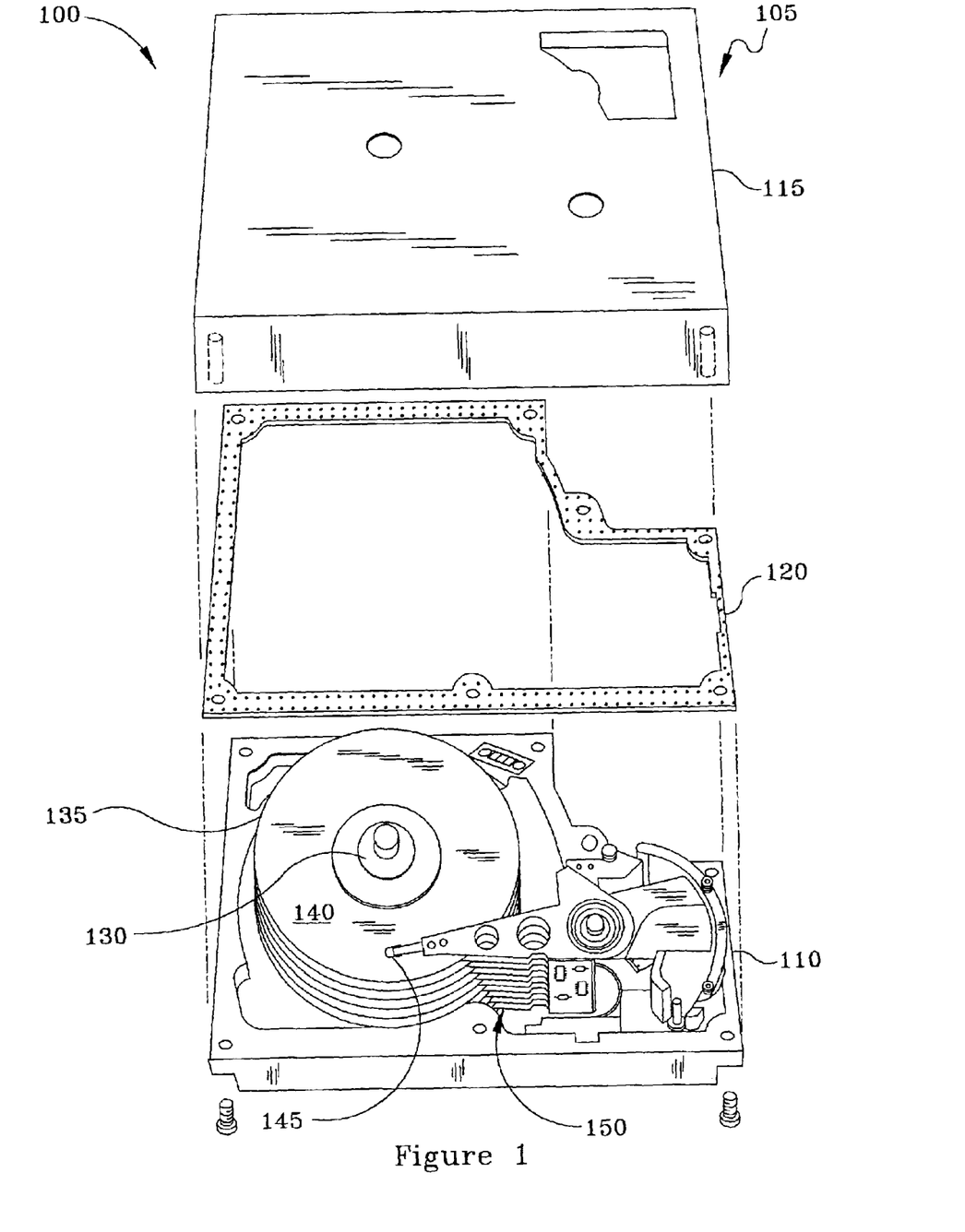
FIG. 1 is an exploded view of a disc drive in which the conical bearing machined by the present invention is especially useful.

FIG. 1 is an exploded perspective view a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of a several radially spaced tracks (not shown). This allows the read/write heads 145 to read and write magnetically encoded information to the magnetic media on the surfaces 140 of the discs 135 at selected locations.

Figure 2:
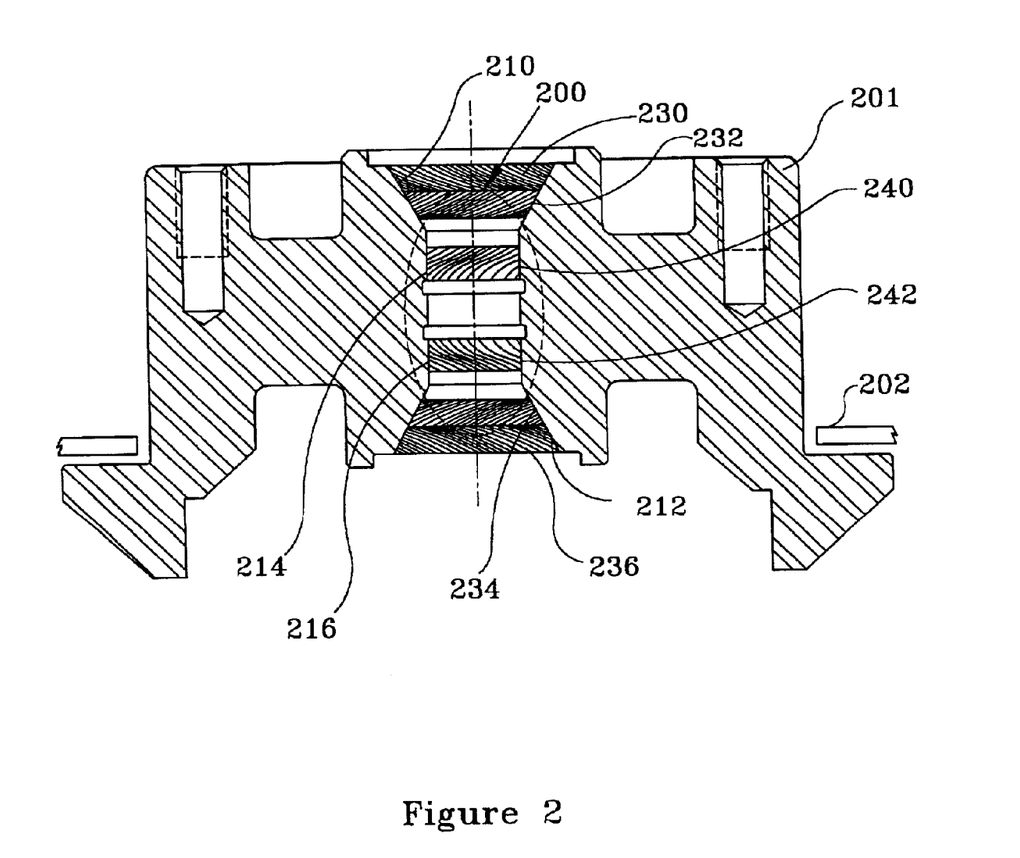
FIG. 2 is a vertical sectional view of a hub utilized in a spindle motor in the disc drive of FIG. 1 showing a dual conical bearing which is of a type which may usefully be formed by the present invention.

FIG. 2 is a vertical sectional view of a hub 201 supported by dual conical and journal bearing 200 for rotation about a shaft (not shown). At least one disk 202 is in turn supported upon an outer surface of the hub 201. The hub 201 is typically integrated with a sleeve as shown herein whose internal surfaces define the grooves which form the hydrodynamic bearing which supports the hub for rotation. As is well-known in this technology, a shaft (not shown) is inserted within the sleeve and has dual male conical surfaces which face the conical regions 210, 212 in the sleeve at the upper and lower ends of the bearing region. The shaft would further include a smooth center section which would cooperate with the journal bearings defined by the grooved regions 214, 216. As is well-known in this field of fluid dynamic bearings, fluid will fill the gap between the stationary shaft and the inner grooved surfaces of the sleeve. As the sleeve rotates, under the impetus of interaction between magnets mounted on an inner surface of the hub which cooperate with windings supported from the base of the hub, pressure is built up in each of the grooved regions. In this way, the shaft easily supports the hub for constant high speed rotation.

The pressure generating grooves on the inner surface of the sleeve can easily be seen in FIG. 2. They include, in the example, two sets of grooves 230, 232 for the upper cone and a corresponding set 234, 236 for the lower cone. This particular design also utilizes two journal bearings 240, 242 to further stabilize the shaft. Obviously, the present invention, which is directed especially to a method and apparatus for making these grooves rather than the design of the grooves themselves, is not limited to making this particular combination of grooved designs. For example, the apparatus and method described could be used to make the grooves inside a single cone or a single cone cooperating with a single journal bearing or dual cones cooperating with one or more journal bearings. Further, each of the conical bearings could have one or more sets of grooves. The principles of the present invention are to be especially applicable in forming any design of conical bearing in the sleeve or bearing seat portion of the design. The solution provided by this invention is important in defining conical bearings because manufacturabllity issues associated with conical parts often make it difficult to control the diameter of the cones.

Given this, it is extremely hard to make a tool with fixed electrodes that will guarantee a consistent work piece to electrode gap. As described above, this gap distance is paramount to the accuracy of groove depth. Considering fluid dynamic bearings, the importance of the accuracy of grooves is that a fluid dynamic bearing generally comprises two relatively rotating member having juxtaposed surfaces between which a layer or film or fluid is maintained to form a dynamic cushion. To form the dynamic cushion, at least one of the surfaces, in this case the interior surface of the hub and sleeve, is provided with grooves which induce fluid flow in the interfacial region and generate a localized region of dynamic high pressure. The grooves are separated by raised lands or ribs and have a depth generally of about 0.009 to 0.015 mm. It is readily apparent that it can be extremely difficult to form grooves having these small dimensions that are relatively closely packed on a surface. To this end, the work piece, which in this case is the hub of FIG. 2, is placed in the grooving device shown in FIG. 3. The apparatus for forming grooves using ECM is shown especially in FIG. 3.

Figure 4:
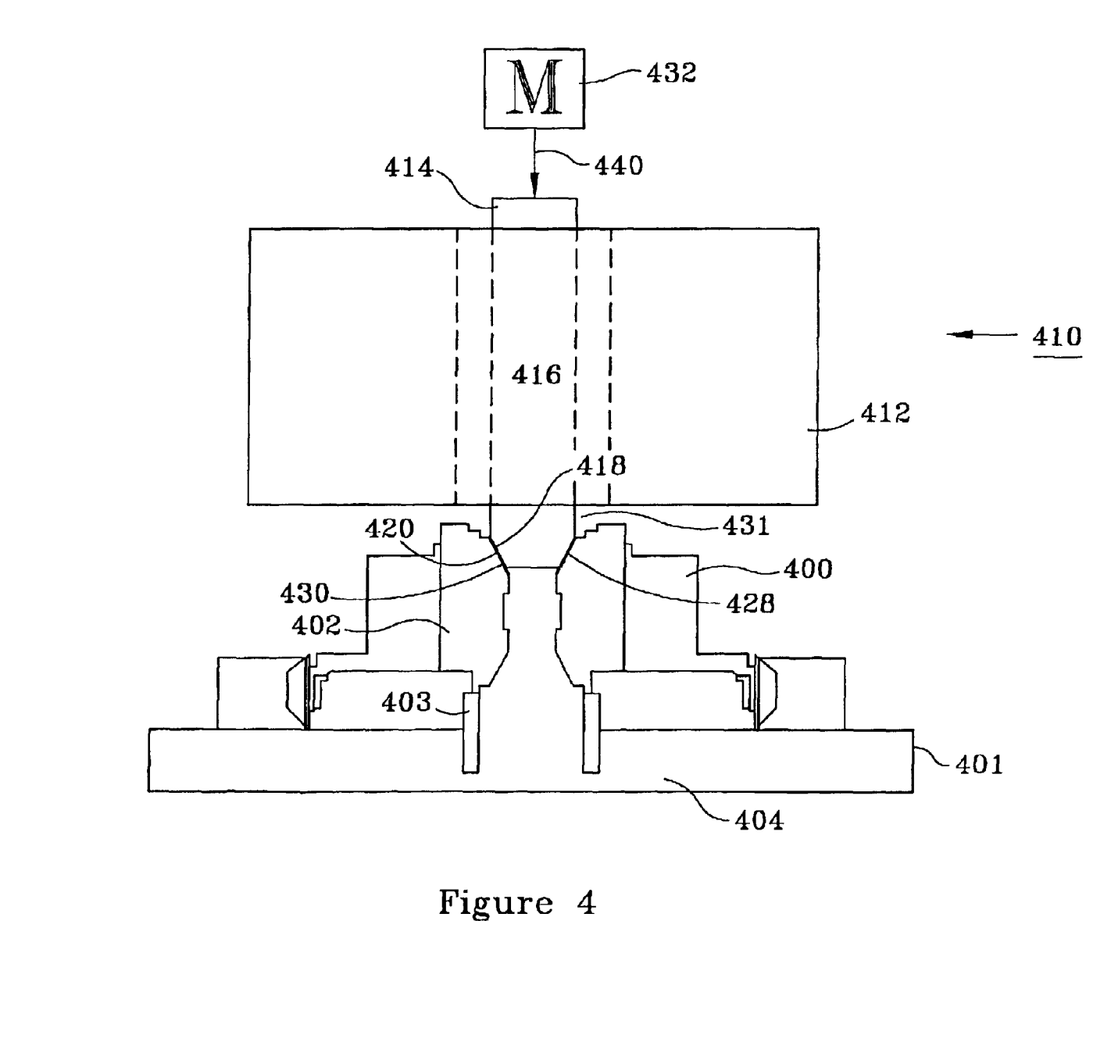
FIG. 4 is a vertical sectional view of apparatus invention which may be used to implement the method of the present invention.

The system shown in FIG. 4 provides an accurate, repeatable method of forming the workpiece of FIG. 2. The workpiece is located on the base 404, which includes an electrolyte inlet 401 and supporting plenum 403. The workpiece rests on the plenum 403 so that the electrolyte does not flow or leak away. The electrolyte is supplied at constant pressure for the reasons explained below. The slide electrode assembly 410 can be used to carry out the ECM process. The slide electrode assembly in this embodiment comprises a static portion 412 and a dynamic element 414 which includes a conductive electrode 416 having a pattern on a surface 418 which is to be defined on the surface of the workpieces 400, 402. The dynamic element is biased toward the gap 420 and the surface 428 of the workpieces by a mass or force 432.

The dynamic element which is movable along the z-axis 440 toward and away from the machining gap 420 is supported for this nearly frictionless movement by the static element of the aerostatic slide. Initially the electrode is positioned either against or very close to the working surfaces 428 of the workpiece 400. The electrolyte which is used to create, establish and maintain the conductive gap between the workpiece surface and conductive surface 418 of the dynamic element 414 is pumped into the gap 420 in a known manner. The pumping provides the electrolyte at a constant, known pressure. The electrode and the slide assembly 414, 416 react to the pressure by moving upward along the z-axis 440 away from the working surface 428 to establish a pre-defined gap 420. The mass 432 acting on the top of the electrode slide assembly 414 has a precalibrated force to be the controlling factor for establishing the machining gap relative to the constant electrode 431 pumping pressure. It is important to note that it is preferable to use a mass instead of a spring in this system, because spring force changes as a function of displacement. Alternatives to a constant mass acting on the slide 416 assembly may be apparent to a person of skill in this field and are within the scope of this invention.

The position of the slide assembly 416 will reach equilibrium with regard to the cross-sectional flow area, hence controlling the machining gap. As noted above, the slide assembly 416 is intended to be near frictionless in the z-axis direction 440 so that the gap dimension 420 is preferably established by the pumping pressure of the elecolyte versus the defined space of the gap and the mass or force 432 which biases the slide assembly toward the gap.

Figure 3:
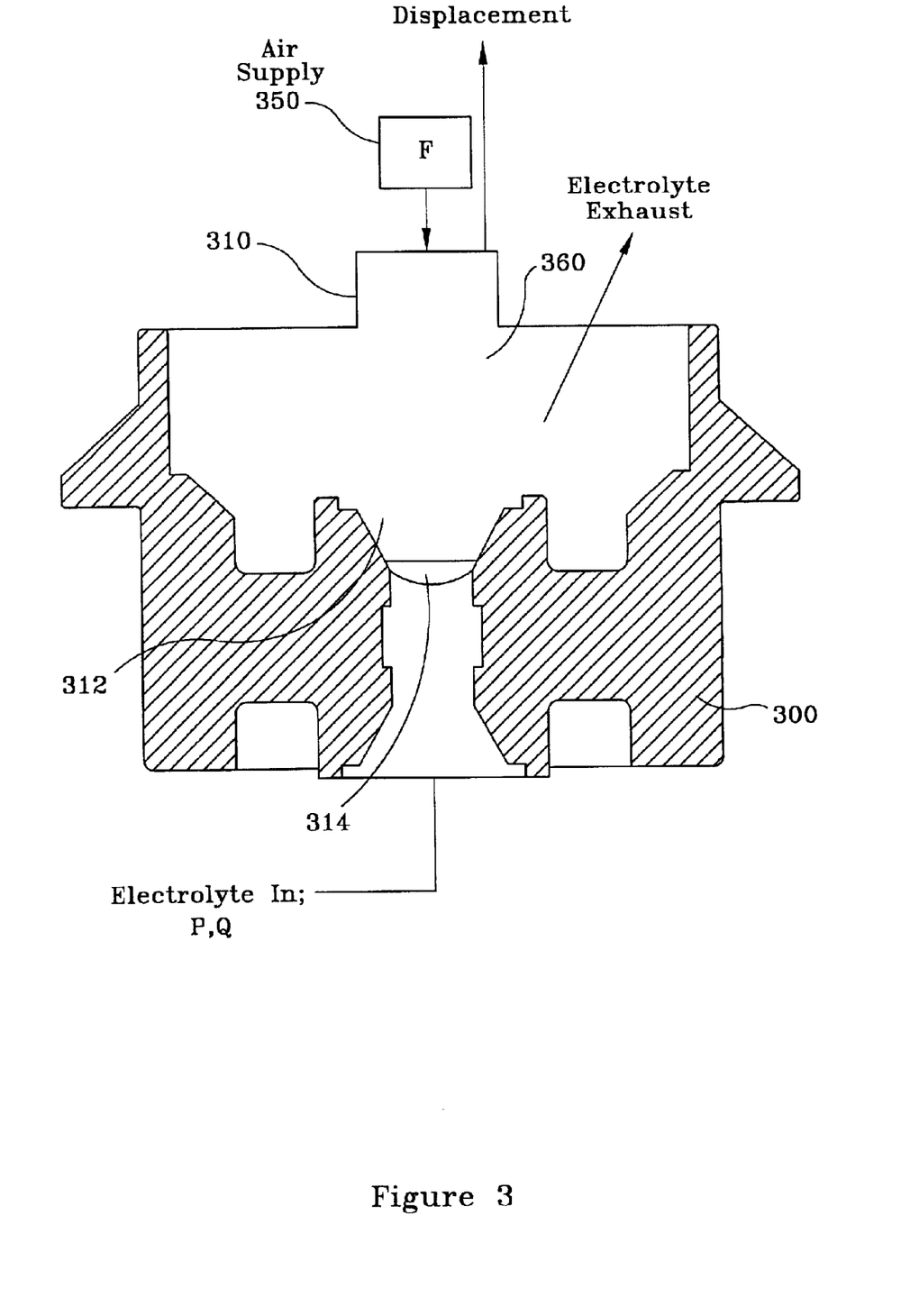
FIG. 3 is a vertical sectional schematic useful in illustrating the process of this invention.

Considering the operational diagram of FIG. 3, the Figure shows, in schematic form, the operational concept herein. Specifically, the FIG. 3 shows the workpiece 300 having an opening for the shaft and bearing cones which will be inserted later to complete the bearing assembly. The dynamic element 310 is also shown, positioned across the gap 312 from the surface 314 to be defined The static element 412 of the aerostatic slide is defined to provide a high force versus displacement ratio in the x and y axis of the dynamic element so that the working surface 418 of the slide remains accurately aligned relative to the surfaces to be grooved 428 and 430. It is preferred that the slide assembly be an aerostatic bearing operating at a high pressure (about 100 psi) with a very small radial clearance (0.002 to 0.003 mm) between the moving element 416 and the static element 412. An additional benefit of using the aerostatic slide mechanism 410 is that it will be self-sealing, which will keep the ECM electrolyte out of critical areas in the electro static slide.

The operational concept is that electrolyte is supplied through the bottom of the workpiece; The force of the electrolyte displaces the electrode upward until an equilibrium is reached; The machining gap then becomes a critical orifice; If P, Q and F are accurately controlled the cross sectional flow area will always be the same, hence the machining gap will automatically be established without the need to make adjustment.

The force F is preferably established by air pressure from an air supply source 350 against the distal end of the dynamic element 310. This same air pressure, in the gap 360 between the dynamic element and the static element (see FIG. 4) prevents electrolyte from entering the gap, establishing at least in part, the self-sealing effect.

Figure 5:
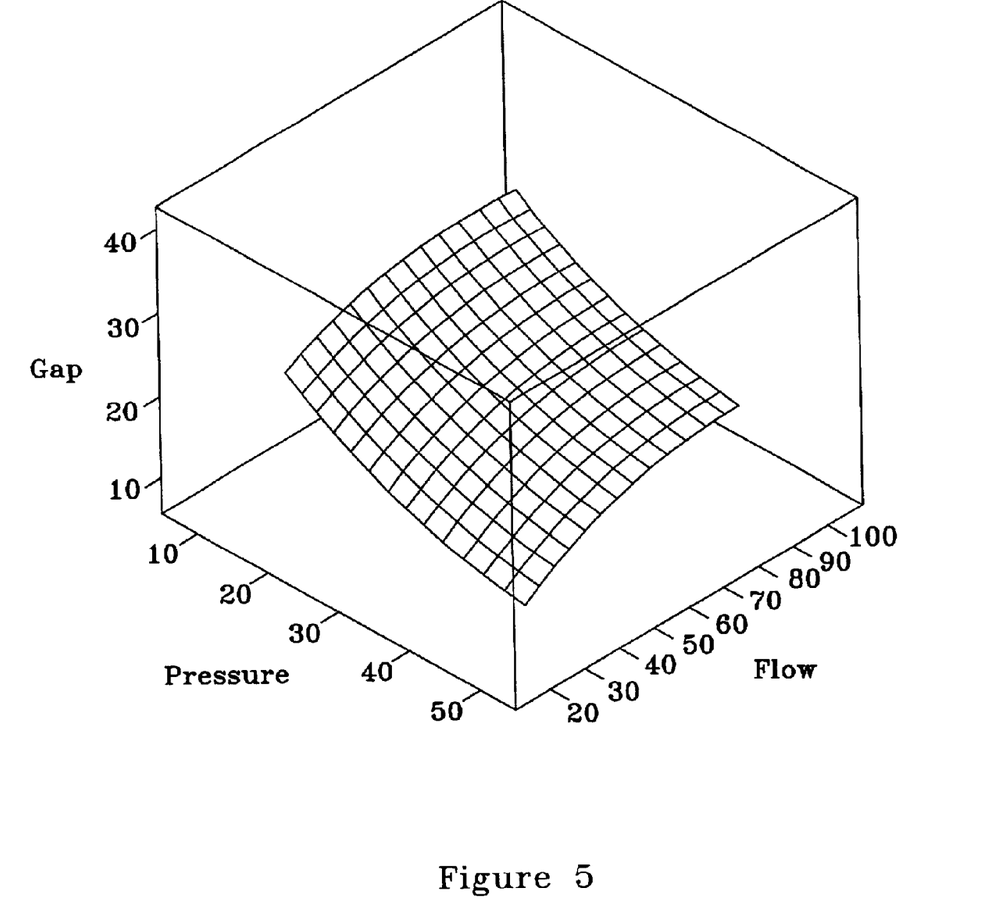
FIG. 5 illustrates a method of calculating the gap used in carrying out the invention.

FIG. 5 is used to illustrate the results of a regression equation used to calculate the gap under certain operating conditions. The equation is:

The regression equation for predicting machining gap:

$$G=19.18175-0.505(P)+0.322(Q)+0.0049(P^2)-0.0009(Q^2)-0.0013(P)(Q) \sigma=1.5 \mu M\ R^2=97\%$$

Where

Gap (G) in microns

Pressure (P) in PSI

Flow (Q) in unitless scale readings (Q) can be converted to actual flow rate with this equation:

$$Flow_{(ml/min)}=3.84(Q)-31.9$$

Tests have demonstrated that this equation predicts the gap, and thus groove accuracy, with about 97% accuracy.

What is claimed:

1. Apparatus for electrochemically etching grooves in a surface of a conical bearing to be utilized in a fluid dynamic bearing, comprising a frame for holding the cone about an axis and facing a movable electrode movable along the axis, the electrode being axially movable and having a surface carrying a groove pattern to fix on an inner surface of the cone, a source of electrolyte to be pumped at a fixed static pressure rate between the surface of the movable electrode and the inner surface of the cone, and a static fixture for supporting the electrode for movement toward and away from the inner surface of the cone with minimal frictional restriction, and a force biasing the electrode surface toward the inner surface of the cone so that the gap through which the electrolyte flows between the inner surface of the cone and the surface of the electrolyte is determined primarily by the static flow rate of the electrolyte and the force bias of the electrode toward the inner surface of the cone.

2. Apparatus claimed in claim 1 wherein the static frame comprises an aerostatic slide, the electrode moving along the axis toward and away from the inner surface of the cone supported primarily by an air bearing in the gap between the static frame and a dynamic element supporting the electrode.

3. Apparatus as claimed in claim 1 wherein the electrode is a conical electrode and comprises a groove pattern on an outer surface thereof, the grooves to be formed in the surface of the conical bearing being defined by the groove pattern.

4. Apparatus' claimed in claim 3 wherein the radial clearance between the dynamic slide and the static frame is about 0.002 to 0.003 mm.

5. Apparatus' claimed in claim 4 comprising a source of air pressure applied to the distal end of the dynamic slide which is also the source of air pressure which supports the dynamic element for movement radially through the static element, the air pressure thereby making the aerostatic slide self-sealing to keep the ECM electrolyte out of critical areas in the electro-static slide.

6. Apparatus' claimed in claim 5 wherein the air pressure in the gap between the dynamic element and the static element is sufficiently high to provide a high force displacement ratio in the x and y axes relative to the axis along which the dynamic element is moving so that the working surface electrode surface of the slide remains accurately aligned relative to the surface to be grooved.

7. Apparatus as claimed in claim 1 wherein the bias of the dynamic element and electrode toward the conical surface is established by pressure against a distal end of the dynamic element.

8. Apparatus as claimed in claim 7 wherein the pressure is defined by air pressure contained with a cell enclosing at least the distal end of the dynamic element.

9. A device is claimed in claim 7 further comprising a source of electrical potential to be applied to the workpiece and electrode respectively, the electrical potential creating a fixed current rate across the gap so that a rate at which an ECM process is carried out is determined primarily by the gap between the electrode surface and the inner surface of the cone.

10. Apparatus for electrochemically etching grooves in a surface of a conical work piece comprising means for fixedly supporting the work piece in the apparatus; and means for biasing an electrode bearing a groove pattern to be etched in the work piece along an axis and across a gap from the conical surface of the work piece, and means for supplying electrolyte to the gap.

11. Apparatus as claimed in claim 10 wherein the means for supplying electrolyte to the gap cooperate with the means for biasing the electrode to thereby set the gap.

12. Apparatus a claimed in claim 11 wherein the means for fixedly supporting the workpiece comprises a frame for holding the workpiece about an axis and facing a movable electrode movable along the axis, the electrode being axially movable and having a surface carrying a groove pattern to fix on an inner surface of the workpiece.

13. Apparatus as claimed in claim 11 wherein the means for applying electrolyte comprise a source of electrolyte to be pumped at a fixed static pressure rate between the surface of the movable electrode and the inner surface of the cone.

14. Apparatus as claimed in claim 11 wherein the means for biasing the electrode comprise a static fixture for supporting the electrode for movement toward and away from the inner surface of the cone with minimal frictional restriction, and a pressure source biasing the electrode surface toward the inner surface of the cone so that the gap through which the electrode flows between the inner surface of the cone and the surface of the electrode is determined primarily by the static flow of the electrolyte and the force bias of the electrode toward the inner surface of the cone.

15. Apparatus a claimed in claim 14 wherein the means for fixedly supporting the workpiece comprises a static frame for holding the workpiece about an axis and facing a movable electrode movable along the axis, the electrode being axially movable and having a surface carrying a groove pattern to fix on an inner surface of the workpiece.

16. A method for electrochemically etching grooves in a surface of a conical bearing to be utilized in a fluid dynamic bearing, comprising a frame for holding the cone about an axis and facing a movable electrode movable along the axis, the electrode being axially movable and having a surface carrying a groove pattern to fix on an inner surface of the cone, pumping electrolyte at a fixed static pressure rate between the surface of the movable electrode and the inner surface of the cone, and supporting the electrode for movement toward and away from the inner surface of the cone with minimal frictional restriction, and biasing the electrode surface toward the inner surface of the cone so that the gap through which the electrode flows between the inner surface of the cone and the surface of the electrode is determined primarily by the static flow rate of the electrolyte and the force bias of the electrode toward the inner surface of the cone.

17. A method as claimed in claim 16 wherein the static frame comprises an aerostatic slide, the method including the step of moving the electrode along the axis toward and away from the inner surface of the cone supported primarily by an air bearing in the gap between the static frame and a dynamic element supporting the electrode.

18. A method as claimed in claim 17 wherein the electrode is a conical electrode and comprises a groove pattern on an outer surface thereof, the method including forming the grooves on the surface of the conical bearing as defined by the grove pattern, the method further providing an electrical potential applied to the workpiece and electrode respectively, the electrical potential creating a fixed current rate across the gap so that a rate at which an ECM process is carried out is determined primarily by, the gap between the electrode surface and the inner surface of the cone.

19. A method as claimed in claim 18 including the step of establishing the bias of the dynamic element and electrode toward the conical surface by air pressure against a distal end of the dynamic element.

20. A method as claimed in claim 19 wherein the air pressure established in the gap between the dynamic element and the static element sufficiently high to provide a high force displacement in the x and y axes relative to the axis along which the dynamic element is moving so that the working surface electrode surface of the slide remains accurately aligned relative to the surface to be grooved.

* * * * *

UNITED STATES PATENT AND TRADEMARK OFFICE
CERTIFICATE OF CORRECTION

PATENT NO. : 6,764,590 B1
DATED : July 20, 2004
INVENTOR(S) : Cochran

It is certified that error appears in the above-identified patent and that said Letters Patent is hereby corrected as shown below:

Column 10,
Line 33, add -- ratio -- after "force displacement".

Signed and Sealed this

Nineteenth Day of April, 2005

JON W. DUDAS
*Director of the United States Patent and Trademark Office*